United States Patent
Farley (10) Patent No.: US 7,589,622 B2
(45) Date of Patent: Sep. 15, 2009

(54) EMERGENCY VEHICLE WARNING LIGHTS

(75) Inventor: William Farley, Knoxville, TN (US)

(73) Assignee: Farley's Custom Auto Services, LLC, Knoxville, TN (US)

( * ) Notice: Subject to any disclaimer, the term of this patent is extended or adjusted under 35 U.S.C. 154(b) by 280 days.

(21) Appl. No.: 11/837,586

(22) Filed: Aug. 13, 2007

(65) Prior Publication Data

US 2008/0036582 A1 Feb. 14, 2008

Related U.S. Application Data

(60) Provisional application No. 60/822,331, filed on Aug. 14, 2006.

(51) Int. Cl.
  *B60Q 1/22* (2006.01)
  *B60Q 1/26* (2006.01)
  *B60Q 1/52* (2006.01)
  *B60Q 1/34* (2006.01)
  *B60Q 1/44* (2006.01)
  *B60Q 3/00* (2006.01)
  *B60Q 1/00* (2006.01)

(52) U.S. Cl. .............. 340/468; 340/463; 340/471; 340/475; 340/479; 362/459; 362/464; 362/487; 362/492; 362/493; 362/505; 362/506

(58) Field of Classification Search ......... 340/463–479, 340/815.45; 362/459, 464, 487, 492, 493, 362/505, 506
See application file for complete search history.

(56) References Cited

U.S. PATENT DOCUMENTS 4,858,082 A * 8/1989 Hayward ................. 362/542
4,981,363 A 1/1991 Lipman
5,560,701 A * 10/1996 Payne ..................... 362/493
5,585,782 A 12/1996 Yosko
D389,929 S 1/1998 Liu
5,851,064 A 12/1998 Lyons
5,938,322 A 8/1999 Alonzo, Jr. et al.
5,988,839 A 11/1999 Pokorney et al.
D419,249 S 1/2000 Ford et al.
D419,702 S 1/2000 Ford et al.
6,087,932 A 7/2000 Belgard
6,380,865 B1 4/2002 Pederson
6,424,269 B1 7/2002 Pederson
6,547,410 B1 4/2003 Pederson
6,623,151 B2 9/2003 Pederson
6,700,502 B1 3/2004 Pederson
6,789,930 B2 9/2004 Pederson
6,946,969 B2 9/2005 Pederson

(Continued)

*Primary Examiner*—Benjamin C Lee
*Assistant Examiner*—Lam P Pham
(74) *Attorney, Agent, or Firm*—Knox Patents; Thomas A. Kulaga (57) ABSTRACT

A system for providing warning lights for emergency vehicles in which the warning lights are incorporated into standard appearing accessories of the vehicle. A hood mounted deflector includes warning lights and takedown lights. Side window vent visors include warning lights, alley lights, and a convenience light. A rear spoiler includes warning lights. The warning lights are connected to at least one controller that provides various patterns of warning lights involving at least one color. In one embodiment, the takedown lights are connected to a controller that provides for flashing the takedown lights in addition to operating them continuously. The convenience light is connected to the interior lights of the vehicle. An operator panel in the vehicle is connected to the controllers and the alley lights.

20 Claims, 7 Drawing Sheets

U.S. PATENT DOCUMENTS

| | | |
|---|---|---|
| 7,038,593 B2 | 5/2006 | Pederson |
| 7,095,334 B2 | 8/2006 | Pederson |
| 7,261,447 B2 * | 8/2007 | Menke et al. ............... 362/503 |
| 7,561,036 B2 * | 7/2009 | Pederson .................... 340/463 |
| 2005/0018441 A1 | 1/2005 | Menke et al. |
| 2007/0194903 A1 * | 8/2007 | Walasik ...................... 340/465 |

\* cited by examiner

EMERGENCY VEHICLE WARNING LIGHTS

CROSS-REFERENCE TO RELATED APPLICATIONS

This application claims the benefit of U.S. Provisional Application Ser. No. 60/822,331, filed Aug. 14, 2006.

STATEMENT REGARDING FEDERALLY SPONSORED RESEARCH OR DEVELOPMENT

Not Applicable

BACKGROUND OF THE INVENTION

1. Field of Invention

This invention pertains to warning lights for emergency vehicles. More particularly, this invention pertains to warning lights that, when actuated, are highly visible and, when not actuated, are not readily discernable as warning lights, thereby providing a stealth mode for the emergency vehicle.

2. Description of the Related Art

Emergency vehicles, when operated during an emergency, must be highly visible to other vehicles and persons in the nearby vicinity of the vehicle. For example, when an emergency vehicle, such as a police cruiser, makes a traffic stop of another vehicle, the emergency vehicle illuminates and displays its warning lights to, first, inform the other vehicle that it must pull over and stop, and, second, to warn other vehicles to stay clear of the emergency vehicle and the stopped vehicle. In this operating mode, the warning lights provide an important notice function, both to the occupants of the stopped vehicle and to others who may encounter the emergency vehicle.

When the warning lights of the emergency are not being operated, the visibility of the warning lights depends upon the purpose of the emergency vehicle. Emergency vehicles that are visibly marked as emergency vehicles, such as marked police cruisers and fire department vehicles, have no need to hide the warning lights when not in use. Other emergency vehicles, such as unmarked police cruisers, have a need for warning lights that are unobtrusive and will not interfere with the activities in which the vehicle may be used. Both types of emergency vehicles have a need for warning lights that are aerodynamically formed so as to reduce wind resistance and wind noise when the vehicle is being operated.

Emergency vehicle warning lights are typically mounted in a manner that allows the lights to be visible on each of the four sides of the vehicle, that is, the front, left and right sides, and the rear of the vehicle. It is common to mount warning lights to the top of a vehicle, such as a police cruiser. Mounted on the roof of the vehicle, the warning lights project a signal 360 degrees around the vehicle.

It is also known to mount warning lights inside the vehicle, for example, inside an unmarked police cruiser. These warning lights either attach to the inside surface of a window or are positioned adjacent the window and are directed outwards. Mounting warning lights in this manner often causes reflections from the windows and stray light that distracts the occupants of the vehicle. In addition to such mounted warning lights often obstructing the view through the window by the vehicle operator, warning lights inside the vehicle often illuminate a portion of the vehicle within the line of sight of the operator, such as the hood or trunk lid, thereby distracting and/or blinding the vehicle occupants.

Examples of this type of warning light mounting include U.S. Pat. No. 4,981,363, issued to Lipman on Jan. 1, 1991, titled "Emergency light/spotlight mechanism for automotive vehicles," which discloses a "windshield mounted combination emergency light/spotlight mechanism." U.S. Pat. No. 6,380,865, issued to Pederson on Apr. 30, 2002, titled "Replacement led lamp assembly and modulated power intensity for light source," discloses a warning signal light 10 attached to the interior of a windshield of an emergency vehicle.

Attempts have been made to incorporate warning lights in equipment that is attached to emergency vehicles. For example, U.S. Pat. No. 5,851,064, issued to Lyons on Dec. 22, 1998, titled "Integrated warning light and rear-view mirror," discloses a side-view mirror with a forward directed warning light. Depending upon the location of the side-view mirror, the warning light illuminates a portion of the side of the vehicle and that portion of the vehicle is potentially within the line of sight of the vehicle occupants. Another example is U.S. Pat. No. 6,087,932, issued to Belgard on Jul. 11, 2000, titled "Light control system," which discloses combining warning lights with the operating lights of the vehicle. While this location avoids illuminating a portion of the car, the warning lights are necessarily located close to the ground, which is a good location of operating lights because that location provides good illumination without blinding or distracting other drivers, but that location does not provide sufficient elevation and visibility to meet the notice requirements of warning lights, which need to have sufficient elevation to make the warning lights visible to other drivers.

BRIEF SUMMARY OF THE INVENTION

According to one embodiment of the present invention, warning lights for an emergency vehicle are provided. An emergency vehicle, such as a police cruiser, has a front light assembly, a set of side light assemblies, and a rear light assembly. Because the light assemblies direct light away from the vehicle and light assemblies are mounted without substantial portions of the vehicle in the light path, the operator of the vehicle is not distracted by reflected light from the light assemblies. In one embodiment, the roof mounted warning light rack is eliminated and replaced with the three light assemblies, which serves to eliminate the wind resistance and wind noise associated with the roof mounted rack. In one embodiment, the emergency vehicle is an unmarked police car in which it is desirable to avoid drawing attention to the vehicle by the warning lights, at least when the warning lights are not being used. In such an embodiment, the light assemblies are integrated in attachments to the vehicle that often appear on non-emergency vehicles, that is, the light assemblies resemble conventional automobile accessories.

The front light assembly includes a set of front warning lights integrated into a deflector attached to the leading edge of the front hood of the vehicle. In various embodiments, the deflector is similar to a bug shield or a wind deflector. The side light assemblies include side warning lights integrated into a set of side window visors, such as a visor that mounts adjacent the upper edge of the side windows of a vehicle. The rear light assembly includes rear warning lights integrated with a rear mounted spoiler, such as one mounted on a trunk lid of the vehicle.

The front light assembly includes a set of front warning lights and a takedown light. The front warning lights are high intensity lights with multiple segments of lamps that illuminate in preselected patterns. In various embodiments, the segments of lamps are all of a single color or are multicolored. The takedown light is a high intensity white light used to signal a stop to another vehicle by illuminating with a flashing pattern and to constantly illuminate an area in front of the emergency vehicle, such as when the vehicle is stopped. The front warning lights and the takedown light are integrated in a member that resembles a bug or wind deflector. The member is attached to the leading edge of the front hood of the vehicle. In various embodiments, the front warning lights and the takedown light are mounted in openings formed in the member or mounted behind a transparent or translucent member.

The side light assemblies include a set of lights on each side of the vehicle. The driver side light assembly includes side warning lights, an alley light, and an area illumination lamp. In one embodiment, the passenger side light assembly includes side warning lights and an alley light. The side warning lights are high intensity lights with multiple segments of lamps that illuminate in preselected patterns. In various embodiments, the segments of lamps are all of a single color or are multicolored. The alley lights are high intensity white lights used to illuminate the area beside the vehicle. The alley lights are controlled to be either on or off. The area illumination, or convenience, light is a light connected to the interior light system of the vehicle to provide illumination beside the vehicle, such as to illuminate a pad in which an officer is writing. The side warning lights, the alley lights, and area illumination lamp are integrated in side window members attached to the door frames above and adjacent to the top edge of the window openings. The side window members resemble vent visors that attach to vehicles.

The rear light assembly includes rear warning lights integrated with a rear spoiler. The rear warning lights are high intensity lights with multiple segments of lamps that illuminate in preselected patterns. In various embodiments, the segments of lamps are all of a single color or are multicolored. In one embodiment, the rear warning lights are mounted inside the spoiler with the rear warning lights projecting light to the rear. In another embodiment, the rear warning lights are mounted above or below a surface of the rear spoiler.

The front light assembly, a set of side light assemblies, and a rear light assembly are connected to a control circuit and/or system that includes one or more controllers and an operator control panel. In one embodiment, a controller is operatively connected to the front warning lights, the side warning lights, and the rear warning lights in order to illuminate the lights in preselected patterns. Another controller is operatively connected to the takedown lights. The operator control panel is connected to the controllers and to the alley lights. In various embodiments, the one or more controllers connected to the warning lights either individually or collectively illuminate the warning lights in one or more preselected visually distinct patterns.

In various embodiments, the lamps providing illumination for the warning lights, takedown light, alley light, and/or area illumination light are one or more of LEDs, halogen, incandescent, or other bright lamp. In one embodiment, the warning lights are formed of light bars of varying length that include a multitude of high intensity light emitting diodes (LEDs) of preselected colors, such colors as commonly used with emergency vehicles and permitted or required by the jurisdictions in which the vehicle is operated. In other embodiments, the takedown light and the alley lights is a collection of high intensity white LEDs providing a beam of bright white light.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A system of warning lights for an emergency vehicle integrated with a deflector attached to the leading edge of the front hood, a set of side window visors, and a rear spoiler are disclosed. Such lights, when illuminated, are used by law enforcement and other emergency agencies to alert the public and protect emergency personnel. There is a need to eliminate or reduce the reflected or incident light visible to occupants of the emergency vehicle when the warning lights are in service. There is also a need for unmarked police cars to have warning lights that are not readily discernable as warning lights when not in use in order to maintain the appearance that the vehicle is not a police car.

Figure 1:
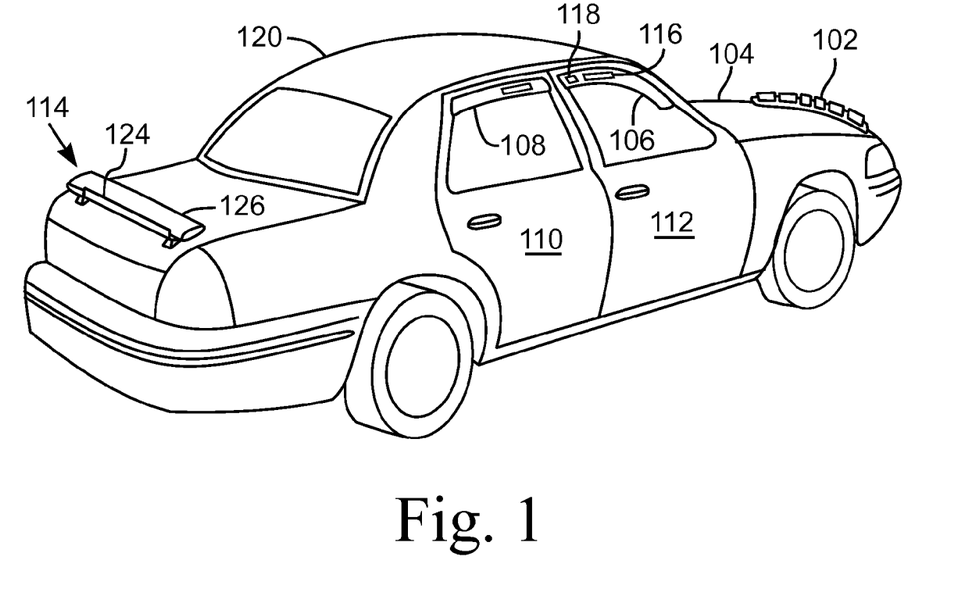
FIG. 1 is a perspective view of an emergency vehicle with one embodiment of the warning lights.

FIG. 1 illustrates a perspective view of an emergency vehicle 120 with one embodiment of the warning lights 102, 106, 108, 114. The front light assembly 102 is attached to the leading edge of the hood 104 of the vehicle 120. The set of side light assemblies 106, 108 are attached to the front and rear side doors 112, 110, respectively, on each side of the vehicle 120. The rear light assembly 114 is attached to the rear of the vehicle 120. The combination of the front light assembly 102, the set of side light assemblies 106, 108, and the rear light assembly 114 provides for a 360 degree projection of warning light illumination around the vehicle 120.

The side light assemblies 106, 108 are integrated with members that appear to bystanders as window vent visors, which are common accessories on non-emergency vehicles; therefore, the vehicle 120 is not readily identifiable as an emergency vehicle 120 because of the side light assemblies 106, 108, when not illuminated. The side light assemblies 106, 108 include a front door side light assembly 106 mounted on each front door 112 of the vehicle. In the illustrated embodiment, the front door side light assembly 106 includes a side warning light 116 and an alley light 118. A rear door side light assembly 108 is mounted on each rear door 110 of the vehicle 120 and also includes a side warning light 116. The side warning lights 116 are high intensity lights that illuminate in preselected patterns with a color suitable for the jurisdiction of the emergency vehicle 120. In various embodiments, the side warning lights 116 are a single color or are multicolored. The alley lights 118 are high intensity white lights that illuminate the area beside the vehicle 120. The alley lights 118 are controlled to be either on or off. Because the side light assemblies 106, 108 are located outside the doors 110, 112 of the vehicle 120 with the side warning lights 116 and the alley lights 118 directed outward, the light emitted from the side warning lights 116 and the alley lights 118 does not illuminate any portion of the vehicle 120, thereby avoiding any light being reflected by the vehicle 120 such that no reflected or incident light is visible to persons in the vehicle 120.

The rear light assembly 114 is integrated with a rear spoiler, which is a common accessory on non-emergency vehicles; therefore, the vehicle 120 is not readily identifiable as an emergency vehicle 120 because of the rear light assembly 114, when not illuminated. The rear light assembly 114 includes a rear warning light 124 that is integrated with a spoiler 126 that is mounted on the rear of the vehicle 120. The rear warning light 124 is directed to the rear of the vehicle 120. The rear warning lights 124 are high intensity lights with multiple segments of lamps that illuminate in preselected patterns. In various embodiments, the segments of lamps are all of a single color or are multicolored. Because the rear warning light 124 is located at the rear of the spoiler 124, which is normally mounted at the extreme rear of the trunk lid of the vehicle 120, the light emitted from the rear warning light 124 does not illuminate any portion of the vehicle 120, thereby avoiding any light being reflected by the vehicle 120 such that no reflected or incident light is visible to persons in the vehicle 120.

Figure 2:
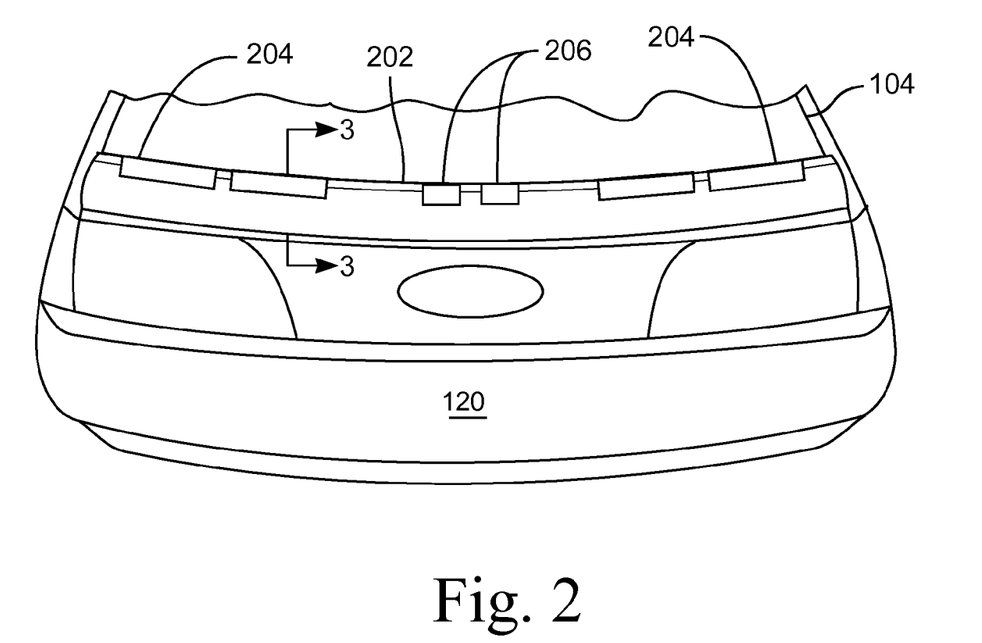
FIG. 2 is a front view of a vehicle with one embodiment of a front light assembly.

FIG. 2 illustrates a front view of a vehicle 120 with one embodiment of a front light assembly 102. The front light assembly 102 includes a deflector 202 with a group of takedown lights 206 between two groups of front warning lights 204. A member, or deflector, 202 is attached to the leading edge of the front hood 104 of the vehicle 120. The front warning lights 204 and the takedown lights 206 are integrated in the member 202 that has a general configuration that resembles a bug or wind deflector. Because deflectors 202 are a common accessory on non-emergency vehicles, the front light assembly 102, when not illuminated, is not readily identifiable as containing warning lights 204, nor is the vehicle 120 readily identifiable as an emergency vehicle 120 because of the front light assembly 102, when not illuminated.

The front warning lights 204 are high intensity lights that are directed to illuminate the space in front of the vehicle 120. The front warning lights 204 include multiple segments of lamps that illuminate in preselected patterns. In various embodiments, the segments of lamps are all of a single color or are multicolored, depending upon the requirements of the jurisdiction in which the vehicle 120 is operating. In one embodiment, the front light assembly 102 includes two pairs of two front warning lights 204, with each pair having one light 204 being blue and the other being red. In such an embodiment, the red and blue lights 204 alternate illuminating either in synchronism with the other pair of lights 204 or with an opposing pattern.

The takedown lights 206 emit a high intensity white light that is directed to illuminate the space in front of the vehicle 120. The takedown lights 206 are used to signal a stop to another vehicle by illuminating with a flashing pattern and to constantly illuminate an area in front of the emergency vehicle 120, such as when the vehicle 120 is stopped. In one embodiment, the takedown lights 206 are each a cluster of high-brightness white light emitting diodes (LEDs). In another embodiment, the takedown lights 206 are each a light bulb, for example, a halogen or incandescent bulb, mounted in a reflector.

Because the front light assembly 102 is located at the leading edge of the hood 104 and the vehicle 120 does not normally have any portion extending in front of the leading edge of the hood 104, the light emitted from the front warning lights 204 and the takedown lights 206 do not illuminate any portion of the vehicle 120, thereby avoiding any light being reflected by the vehicle 120 such that no reflected or incident light is visible to persons in the vehicle 120.

Figure 3:
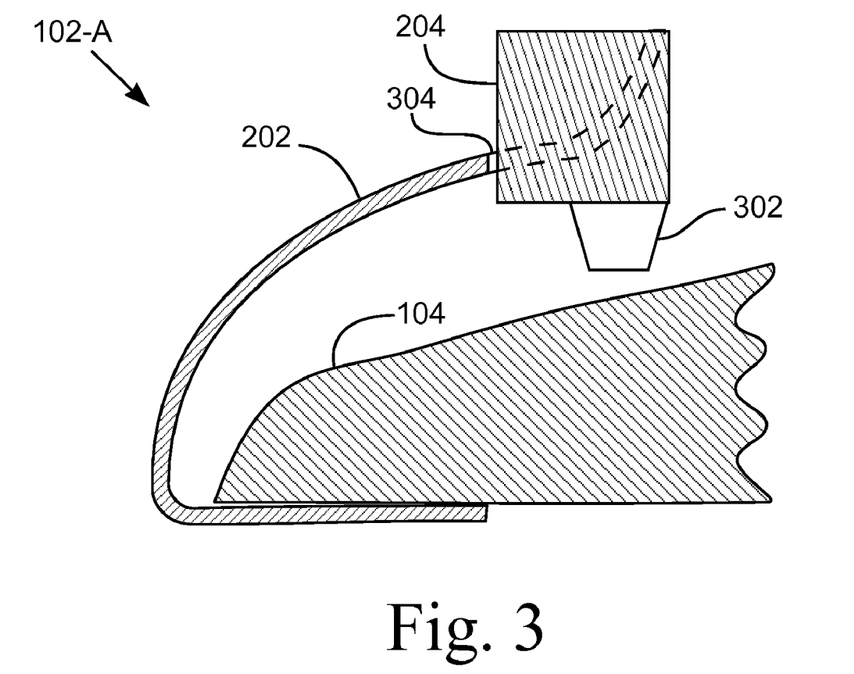
FIG. 3 is a cross-sectional view of one embodiment of a front light assembly.

FIG. 3 illustrates a cross-sectional view of one embodiment of a front light assembly 102-A. The illustrated cross-sectional view is of a front warning light 204, but, one skilled in the art will recognize that the following discussion applies equally to the takedown lights 206.

The deflector 202 has a curved profile that deflects wind and bugs up and over the hood 104 of the vehicle 120. In various embodiments, the deflector 202 is a thin, rigid plaster member that is clear, translucent, or opaque. In the illustrated embodiment, the front warning lights 204 are rectangular in cross-section and fit into an opening 304 in the deflector 202 such that the front warning lights 204 project light forward through the opening 304. In one embodiment, the front warning light 204 is secured to the deflector 202 by an adhesive, for example, an epoxy, disposed in the opening 304 between the deflector 202 and the front warning light 204. In other embodiments, the front warning lights 204 is attached to the deflector 202 with a bracket or by directly securing the front warning lights 204 to the deflector 202.

Typically, the deflector 202 is a thin, rigid plastic member. The addition of the weight of the front warning lights 204 at the end of the deflector 202 opposite its mounting to the hood 104 often results in vibration at high speed. A resilient bumper 302 is positioned under the front warning lights 204 to minimize the deflection of the deflector 202 under extreme operating conditions. The bumpers 302 prevent the lights 204, 206 from contacting the hood 104 and serve to maintain the orientation of the lights 204, 206 in a forward direction.

Figure 4:
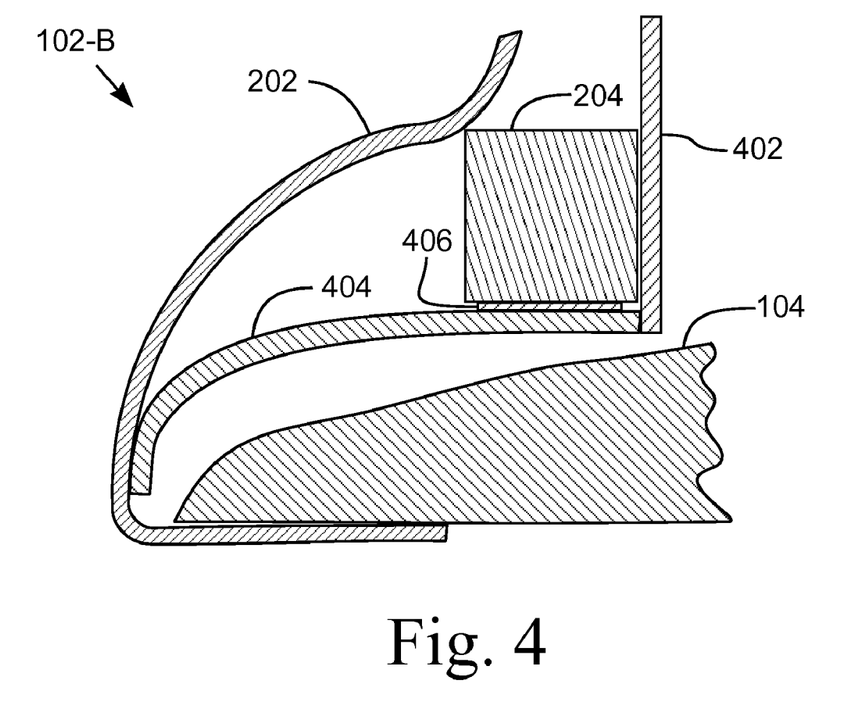
FIG. 4 is a cross-sectional view of another embodiment of a front light assembly.

FIG. 4 illustrates a cross-sectional view of another embodiment of a front light assembly 102-B. The illustrated cross-sectional view is of a front warning light 204, but, one skilled in the art will recognize that the following discussion applies equally to the takedown lights 206. A support member 404 provides a platform to which the front warning light 204 is attached. In the illustrated embodiment, a double sided tape, or other adhesive, 406 secures the front warning light 204 to the support member 404. The front warning light 204 is positioned behind the deflector 202, which is transparent to the color of light emitted by the front warning light 204. In one embodiment, the deflector 202 is generally translucent or opaque with transparent sections immediately adjacent the front warning light 204. The deflector 202 of the front light assembly 102-B provides a physical barrier that deflects rain, dust, debris, bugs, and other objects and materials away from the front warning lights 204 and the takedown lights 206.

In the illustrated embodiment, the support member 404 is attached to the deflector 202. In another embodiment, the support member 404 is attached to the leading edge of the hood 104. In either embodiment, the support member 404 is a rigid member that is not subject to wind loads from the front warning light 204 because the light 204 is protected from the wind by the deflector 202.

In the illustrated embodiment, a shield 402 is positioned behind the front warning light 204. The front warning lights 204 are positioned in at the leading edge of the hood 104 and the light emitted by the front warning lights 204 and the takedown lights 206 do not illuminate any portion of the vehicle 120 except for the deflector 202. The shield 402 is an opaque barrier between any light reflected from the back side of the deflector 202 and a person inside the vehicle 120. In one embodiment, the shield 402 is one piece with the support member 404. In other embodiments, the shield 402 is attached to one or both of the front warning light 204 and the support member 404, such as with double sided tape, or an adhesive, 406.

In still another embodiment of the front light assembly 102, the support bracket 404 is used in conjunction with openings 304 in the deflector 202. In such an embodiment, the front portion of the front warning light 204 is aligned with the opening 304, but the front warning light 204 is not supported by the deflector 202.

Figure 5:
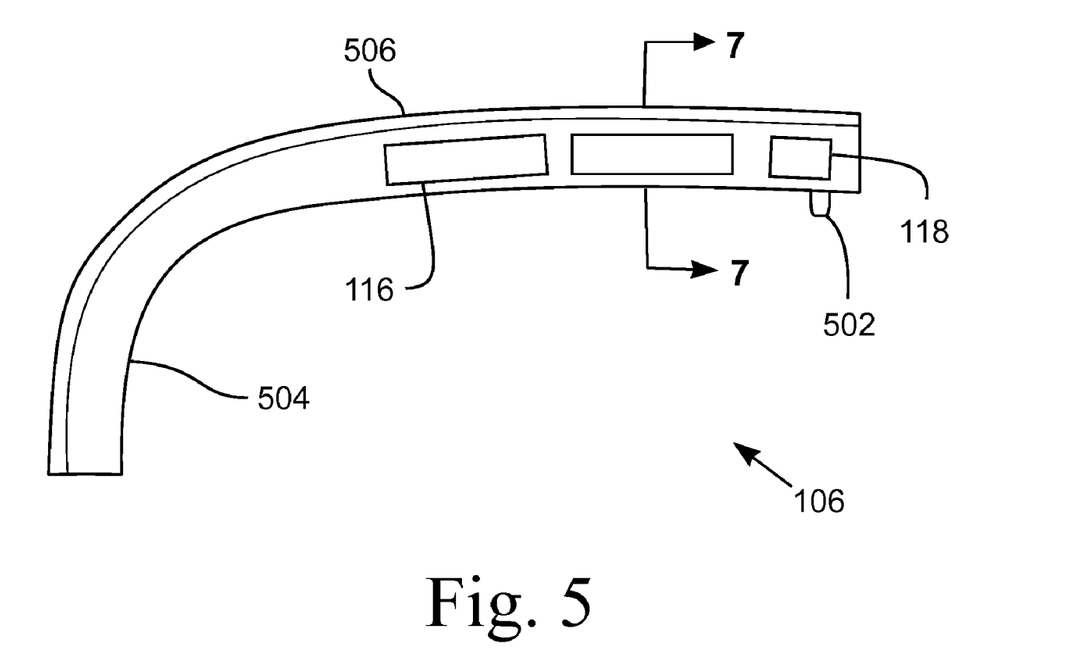
FIG. 5 is a front view of one embodiment of a front door side light assembly.

FIG. 5 illustrates a front view of one embodiment of a front door side light assembly 106 for the front side door 112 on the left side of the vehicle 120. The front door side light assembly 106 for the front side door 112 on the right side of the vehicle 120 is a mirror image of the illustrated embodiment. The front door light assembly 106 has a general configuration that resembles a side window vent visor, which is a thin plastic member that attaches to a side door 112 and covers a portion of the leading edge and the topmost portion of the side window opening. The front door light assembly 106 includes a mounting lip 506 and a visor body 504. The mounting lip 506 is adapted to attach to the front door 112. In one embodiment, the back side of the mounting lip 506 is adhered to the window frame of the front door 112. In another embodiment, the mounting lip 506 fits into the window channel of the front door 112. In either embodiment, the front door light assembly 106 is securely fixed to the front door 112 of the vehicle 120.

The illustrated embodiment of the front door side light assembly 106 includes a pair of side warning lights 116, an alley light 118, and a convenience light 502. The side warning lights 116 are high intensity lights that direct illumination to the side of the vehicle 120. Those skilled in the art will recognize that the number and size of the side warning lights 116 can vary depending upon the size and configuration of the visor body 504 without departing from the spirit and scope of the present invention.

The alley lights 118 are high intensity white lights that direct illumination to the area beside the vehicle 120. The alley lights 118 are controlled to be either on or off. In one embodiment, the alley light 118 is a cluster of high-brightness white light emitting diodes (LEDs). In another embodiment, the alley light 118 is a light bulb, for example, a halogen or incandescent bulb, mounted in a reflector.

The convenience light, or area illumination light, 502 is a light connected to the interior light system of the vehicle 120 that provides illumination beside the vehicle 120, such as provide illumination for a person beside the vehicle 120. In one embodiment, the convenience light 502 is located only on the front door side light assembly 106 mounted on the driver's side door 112. In another embodiment, a convenience light 502 is located on each front door side light assembly 106.

Figure 6:
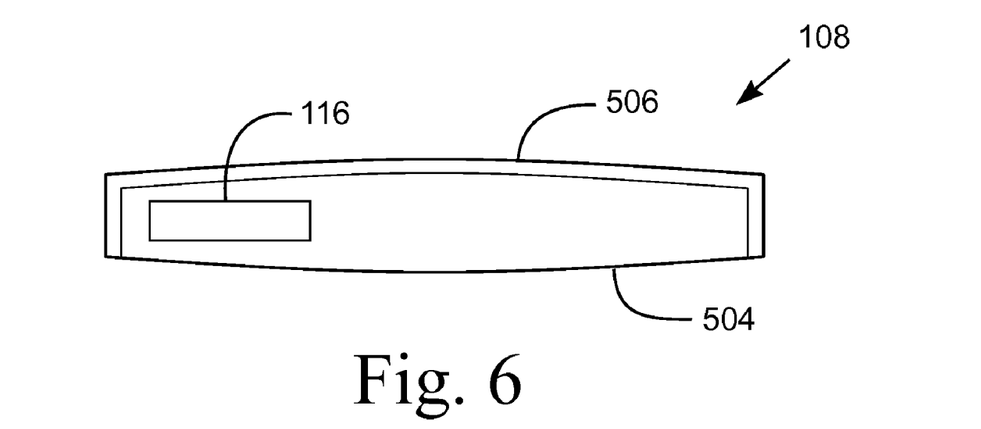
FIG. 6 is a front view of one embodiment of a rear door side light assembly.

FIG. 6 illustrates a front view of one embodiment of a rear door side light assembly 108 for the rear side door 110 on the left side of the vehicle 120. The front door side light assembly 108 for the front side door 112 on the right side of the vehicle 120 is a mirror image of the illustrated embodiment. The rear door light assembly 108 has a general configuration that resembles a side window vent visor, which is a thin plastic member that attaches to a rear side door 110 and covers the topmost portion of the rear side window opening. The rear door light assembly 108 includes a mounting lip 506 and a visor body 504. The mounting lip 506 is adapted to attach to the rear door 110. In one embodiment, the back side of the mounting lip 506 is adhered to the window frame of the rear door 110. In another embodiment, the mounting lip 506 fits into the window channel of the rear door 110. In either embodiment, the rear door light assembly 108 is securely fixed to the rear door 110 of the vehicle 120.

The illustrated embodiment of the rear door side light assembly 108 includes a single side warning light 116. Those skilled in the art will recognize that the number and size of the side warning lights 116 integrated in the front door side light assembly 106 and the rear door side light assembly 108, collectively, can vary without departing from the spirit and scope of the present invention. The side warning lights 116 include multiple segments of lamps that illuminate in preselected patterns. In various embodiments, the segments of lamps are all of a single color or are multicolored.

Figures 7, 8:
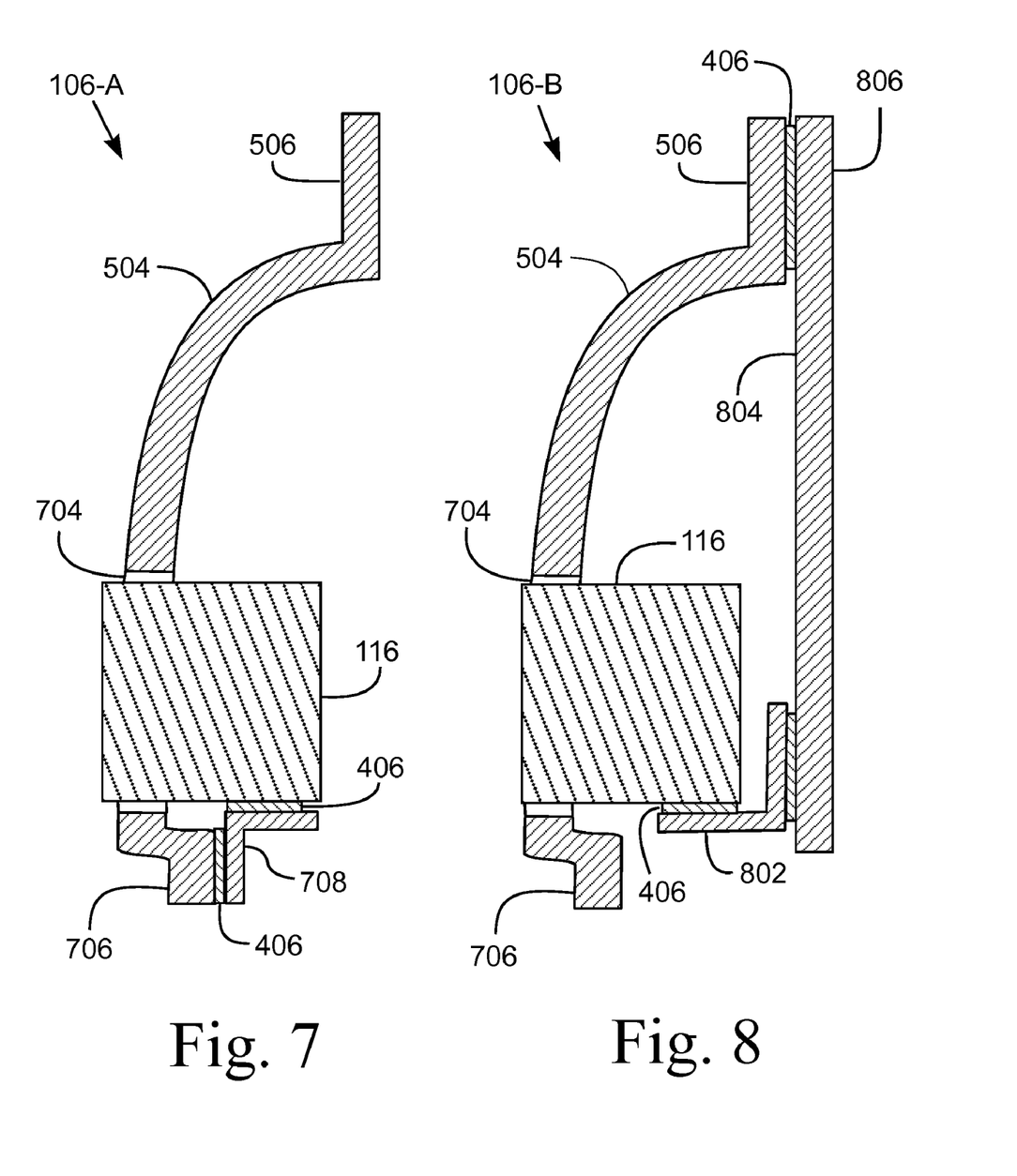
FIG. 7 is a cross-sectional view of one embodiment of a side light assembly.
FIG. 8 is a cross-sectional view of another embodiment of a side light assembly.

FIG. 7 illustrates a cross-sectional view of one embodiment of a side light assembly 106-A. The illustrated cross-sectional view is of a front door side light assembly 106, but, one skilled in the art will recognize that the following discussion applies equally to the rear door side light assembly 108. The illustrated cross-sectional view is of a side warning light 116, but, one skilled in the art will recognize that the following discussion applies equally to the alley light 118.

The visor body 504 has an opening 704 into which the side warning light 116 fits. The visor body 504 has a lower lip 706 having an inboard surface that is flat. An angle member 708 is attached to the lower lip 706 with double-sided tape, or an adhesive, 406. In other embodiments, the angle member 708 is attached to the lower lip 706 by heat or ultrasonic welding, solvent welding, or with fasteners. The side warning light 116 rests upon and is secured to the top surface of the angle member 708 with double-sided tape, or an adhesive, 406. In still another embodiment, the angle member 708 is integrated with the visor body 504 such that the visor body 504 has a horizontal lip that supports the side warning light 116.

FIG. 8 illustrates a cross-sectional view of another embodiment of a side light assembly 106-B. The illustrated cross-sectional view is of a front door side light assembly 106, but, one skilled in the art will recognize that the following discussion applies equally to the rear door side light assembly 108. The illustrated cross-sectional view is of a side warning light 116, but, one skilled in the art will recognize that the following discussion applies equally to the alley light 118.

A back plate 806 is attached to the mounting lip 506 with double-sided tape, or an adhesive, 406. In other embodiments, the back plate 806 is attached to the mounting lip 506 by heat or ultrasonic welding, solvent welding, or with fasteners. The back plate 806 extends downward past the opening 704 in the visor body 504. An angle member 802 is secured to the lower portion of the back plate 806 with double-sided tape, or an adhesive, 406. In other embodiments, the angle member 802 is attached to the back plate 806 by heat or ultrasonic welding, solvent welding, or with fasteners.

The side warning light 116 rests upon and is secured to the inside surface of the angle member 802 with double-sided tape, or an adhesive, 406. The outboard end of the side warning light 116 aligns with the opening 704 in the visor body 504. In another embodiment, the angle member 802 is integrated with the back plate 806 such that the back plate 806 has a horizontal lip at its bottom edge that supports the side warning light 116.

In another embodiment, the side warning light 116 is mounted behind the visor body 504, which does not have an opening 704. The visor body 504 is transparent to the light emitted by the side warning light 116 and the back plate 806 is opaque to provide shielding to any light reflected from the inboard surface of the visor body 504. In another such embodiment, the visor body 504 is translucent or opaque with a transparent section adjacent the side warning light 116.

Figure 9:
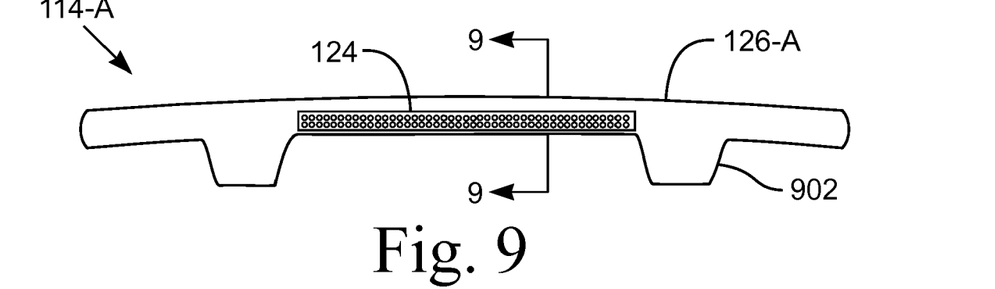
FIG. 9 is a rear view of one embodiment of a rear light assembly.
Figure 10:
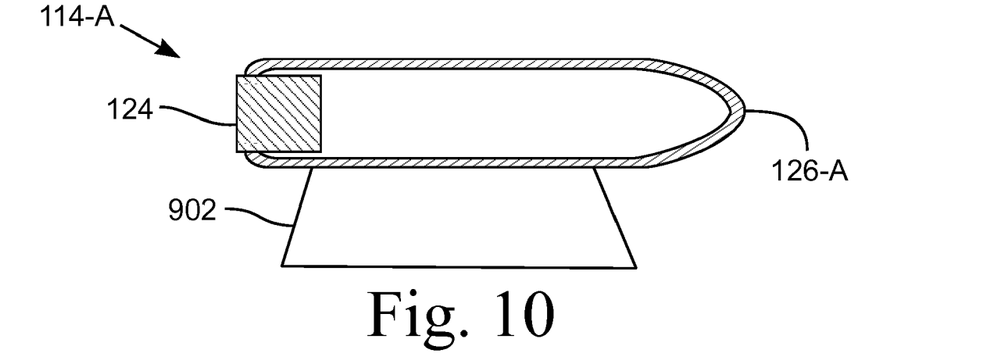
FIG. 10 is a cross-sectional view of the embodiment of the rear light assembly of FIG. 9.

FIG. 9 illustrates a rear view of one embodiment of a rear light assembly 114-A. FIG. 10 illustrates a cross-sectional view of the embodiment of the rear light assembly 114-A illustrated in FIG. 9.

The rear light assembly 114-A includes a rear spoiler 126-A with an integrated rear warning light 124. A portion of the rear warning light 124 is inside a cavity in the spoiler 126-A with the light projecting end of the rear warning light 124 even with or protruding from the rear end of the spoiler 126-A. In the illustrated embodiment, the spoiler 126-A includes supports 902 located inboard of the ends of the spoiler 126-A with the rear warning light 124 positioned between the supports 902. Those skilled in the art will recognize that the configuration of the spoiler 126-A varies with the style of the car and design of the spoiler 126-A and the that the width and size of the rear warning light 124 can vary without departing from the spirit and scope of the present invention.

The rear warning light 124 is a high intensity light. The intensity of the rear warning light 124 is significantly greater than the intensity of the rear brake lights on the vehicle 120. In one embodiment, the rear warning light 124 is divided into segments six inches wide. In various embodiments, the segments of lamps are all of a single color or are multicolored. The various segments are illuminated with preselected patterns.

Figure 11:
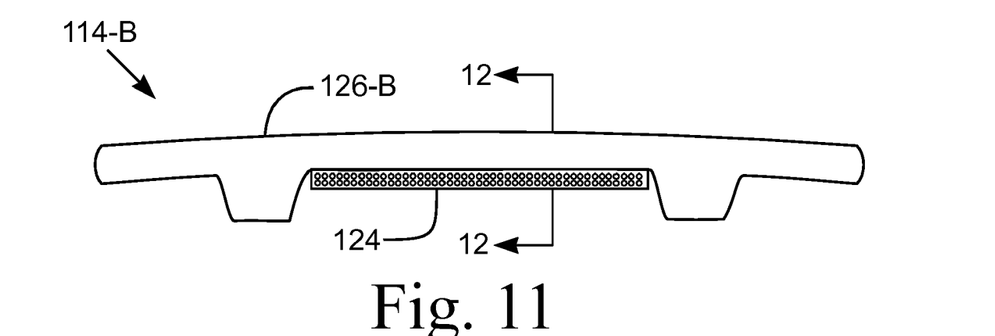
FIG. 11 is a rear view of another embodiment of a rear light assembly.
Figure 12:
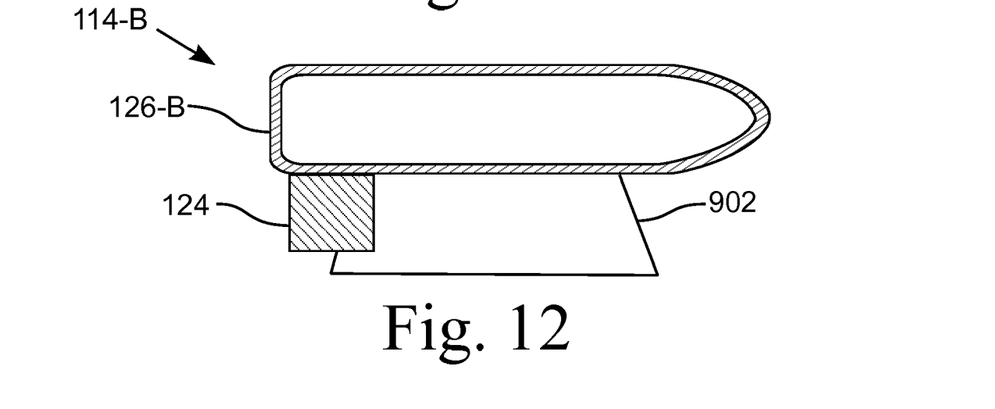
FIG. 12 is a cross-sectional view of the embodiment of the rear light assembly of FIG. 11.

FIG. 11 illustrates a rear view of another embodiment of a rear light assembly 114-B. FIG. 12 illustrates a cross-sectional view of the embodiment of the rear light assembly 114-B illustrated in FIG. 11.

The rear light assembly 114-B includes a rear spoiler 126-B with an integrated rear warning light 124. The rear warning light 124 is positioned below the spoiler 126-A with the light projecting end of the rear warning light 124. In the illustrated embodiment, the spoiler 126-B includes supports 902 located inboard of the ends of the spoiler 126-B with the rear warning light 124 positioned between the supports 902. Those skilled in the art will recognize that the configuration of the spoiler 126-A varies with the style of the car and design of the spoiler 126-A and that the width and size of the rear warning light 124 can vary without departing from the spirit and scope of the present invention.

In the illustrated embodiment of the rear light assembly 114-B, the rear warning light 124 is attached to the lower surface of the rear spoiler 126-B. The rear warning light 124 is attached with a double-sided tape or adhesive. In one embodiment in which the lower surface of the spoiler 126-B is not flat, the gaps between the spoiler 126-B and the rear warning light 124 have a filler. In still another embodiment, the rear warning light 124 is attached to the top surface of the spoiler 126-B.

Figure 13:
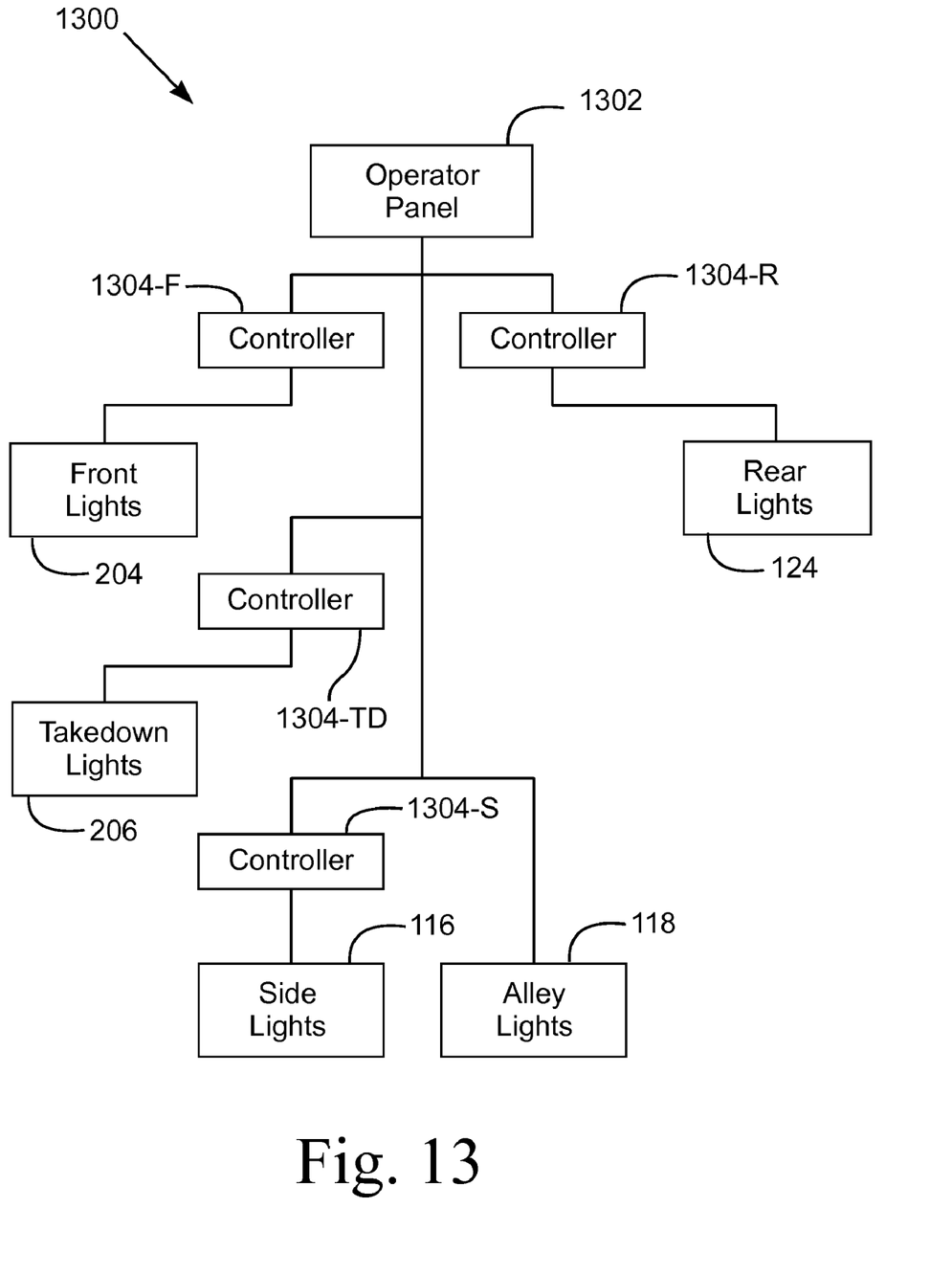
FIG. 13 is a block diagram of one embodiment of the control system for the warning light system.

FIG. 13 illustrates a block diagram of one embodiment of the control system for the warning light system 1300. An operator panel 1302 is located in the vehicle 120 at a position readily accessible to the occupants. In various embodiments, the operator panel 1302 includes switches and indicator lamps for controlling the individual warning lights 204, 116, 124, the takedown lights 206, and the alley lights 118.

A front light controller 1304-F is connected to the front warning lights 204 to control the illumination of the front warning lights 204. In the embodiment illustrated in FIG. 2, the front light assembly 102 includes four front warning lights 204. In various embodiments, the front warning lights 204 are all of a single color or are multicolored with the controller 1304-F controlling each of the front warning lights 204 individually or collectively.

A side light controller 1304-S is connected to the side warning lights 116 to control the illumination of the side warning lights 116. In the embodiment illustrated in FIGS. 5 and 6, the side light assembly 106, 108 on each side of the vehicle 120 includes three side warning lights 116. In various embodiments, the side warning lights 116 are all of a single color or are multicolored with the controller 1304-S controlling each of the side warning lights 116 individually or collectively.

A rear light controller 1304-R is connected to the rear warning lights 124 to control the illumination of the rear warning light 124. In the embodiment illustrated in FIG. 1, the rear light assembly 114 includes one rear warning light 124 made of multiple segments. In various embodiments, the segments of the rear warning light 124 are all of a single color or are multicolored with the controller 1304-R controlling each of the segments of the rear warning light 124 individually or collectively.

A takedown light controller 1304-TD is connected to the takedown lights 206 to control the illumination of the takedown lights 206. In the embodiment illustrated in FIG. 2, the front light assembly 102 includes two takedown lights 206. The takedown lights 206 are all of a single color with the controller 1304-F controlling each of the takedown lights 206 individually or collectively.

The operator panel 1302 controls the alley lights 118 directly to be either on or off. In various embodiments, the alley lights 118 on each side of the vehicle 120 are controlled independently or together.

In another embodiment, the controllers 1304-F, 1304-S, 1304-R for the warning lights 204, 116, 124 are combined into a single master controller 1304 that provides the control of the various lights 204, 116, 124, either individually or together as a single group of lights. In still another embodiment, the controllers 1304-F, 1304-S, 1304-R for the warning lights 204, 116, 124 and the controllers 1304-TD for the takedown lights 206 are combined into a single master controller 1304 that provides the control of the various lights 204, 116, 124, 118.

Each controller 1304 is device that receives inputs from the operator panel 1302. The inputs are evaluated by the controller 1304 to cause the associated light 204, 206, 116, 124 to illuminate in a specified manner. In various embodiments, the warning lights 204, 116, 124 are all of a single color or are multicolored. Each controller 1304 provides electrical power to a corresponding one or more of the lights 204, 116, 124 to actuate the lights 204, 116, 124 with a pre-selected pattern. The patterns include the different order or sequence of actuating the lights 204, 116, 124 in addition to the frequency of actuation. For example, one pattern, called double alternating, includes actuating two pairs of lights with each pair of two lights being switched with an alternating pattern. Another pattern is commonly called random, which randomly changes the pattern to avoid a hypnosis inducing reaction in people who observe the warning lights 204, 116, 124.

Figure 14:
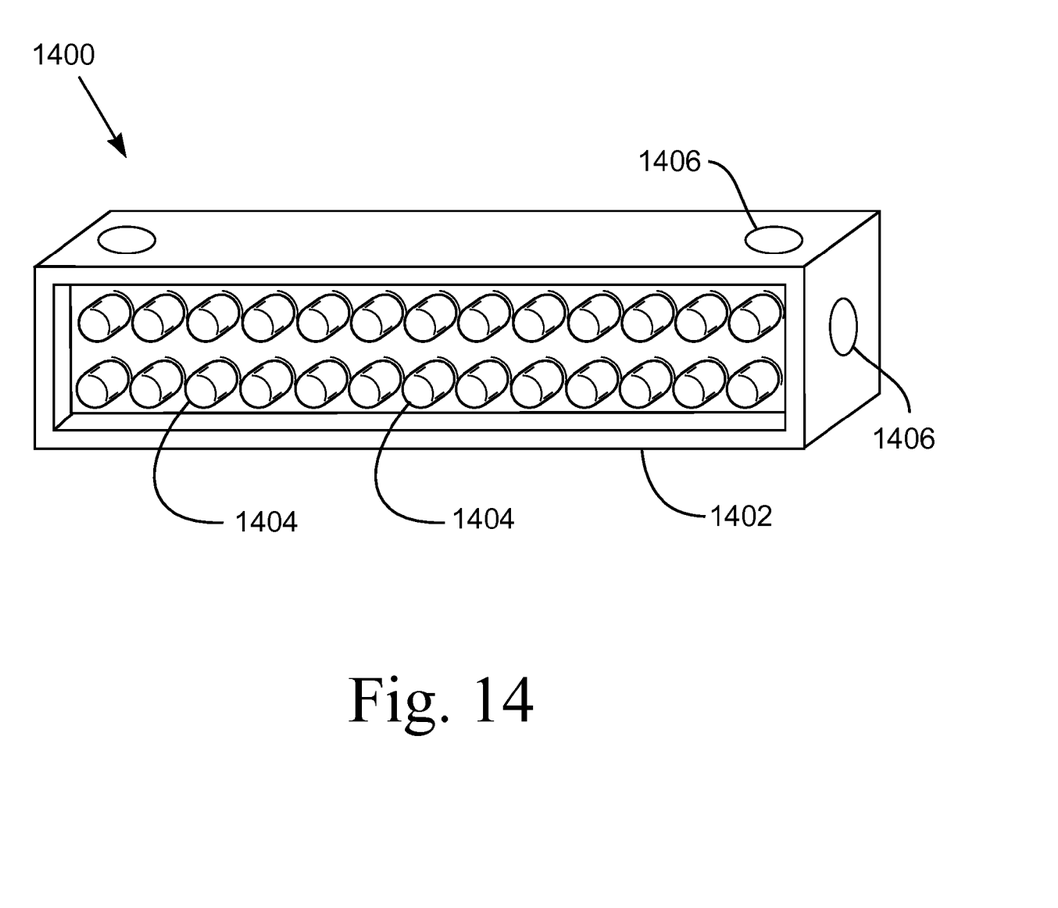
FIG. 14 is a perspective view of one embodiment of a light bar.

FIG. 14 illustrates a perspective view of one embodiment of a light bar 1400. The light bar 1400 includes a housing 1402 with a multitude of lamps 1404 on one face. The housing 1402 includes a multitude of mounting holes 1406 adapted to mount the light bar 1400. The lamps 1404 are sealed, such as with a potting compound, inside the housing 1402 such that the light bar 1400 is able to operate in various environments, include an outdoor environment where the light bar 1400 is exposed to the weather.

In the illustrated embodiment, the light bar 1400 has a rectangular cross-section of approximately 1⅜ inch square and is approximately 6 inches long. In other embodiments, the light bar 1400 has different dimensions and/or configurations, such as being longer and/or less deep.

In one embodiment, the lamps 1404 are light emitting diodes (LEDs) that have a high intensity. In other embodiments, the lamps 1404 are one or more of LEDs, halogen, incandescent, or another type of bright lamp.

In one embodiment, the light bar 1400 emits light of a single color, that is, the light bar 1400 is monochromatic. All the lamps 1404 are connected together such that a single electrical power connection illuminates all the lamps 1404. Such an embodiment is suitable for use individually for the front warning lights 204 and the side warning lights 116. Further, several light bars 1400 are suitable for use as the rear warning light 124. In another embodiment, the light bar 1400 emits light of more than one selected color. In one such embodiment, the lamps 1404 are the type that emit one of multiple colors, dependent upon how the lamp 1404 is energized and controlled.

In one embodiment, the light bar 1400 comes in various sizes with every few inches, for example, every six inches, defining a segment. Each segment has lamps 1404 of a single color that are actuated as a group. In such an embodiment, the light bar 1400 includes several segments of lamps 1404 with each segment having its own electrical power connection for illuminating each segment individually. Such an embodiment is suitable for use as the rear warning light 124.

The warning light system includes various functions. The function of camouflaging the warning lights 204, 116, 124 is implemented, in one embodiment, by the front warning lights 204 being integrated in the deflector 202, the side warning lights 116 being integrated in a window vent visor 504, and the rear warning light 124 being integrated in a spoiler 126. The deflector 202, vent visors 504, and spoiler 126 are accessories commonly found on non-emergency vehicles, accordingly, they do not readily identify the vehicle 120 as anything other than a normal, non-emergency vehicle, just like any other one on the road.

The function of eliminating reflected or incident light visible to occupants of the emergency vehicle when the warning lights 204, 116, 124 are illuminated is implemented, in one embodiment, by the front light assembly 102 being mounted at the leading edge of the hood 104 of the vehicle 120, the set of side light assemblies 106, 108 being mounted outside the side doors 112, 110, and the rear light assembly being mounted at the rear end of the spoiler 126 attached at the back of the vehicle 120.

The function of eliminating reflected or incident light visible to occupants of the emergency vehicle when the takedown lights 206 are illuminated is implemented, in one embodiment, by the front light assembly 102 being mounted at the leading edge of the hood 104 of the vehicle 120.

The function of eliminating reflected or incident light visible to occupants of the emergency vehicle when the alley lights 118 are illuminated is implemented, in one embodiment, by the set of side light assemblies 106, 108 being mounted outside the side doors 112, 110.

From the foregoing description, it will be recognized by those skilled in the art that a system of warning lights for emergency vehicles in which the warning lights are incorporated into standard appearing accessories of the vehicle has been provided. The system includes a front light assembly, side light assemblies, and rear light assemblies. The front light assembly include warning lights and takedown lights integrated into a bug or wind shield adapted to be attached to the leading edge of the hood. The side light assemblies include warning lights, alley lights, and a convenience light integrated into side window vent visors. The rear light assembly includes warning lights integrated with a rear spoiler. Because the lights are integrated into standard appearing accessories similar to those found on privately owned vehicles, the system is suitable for unmarked police vehicles or other vehicles in which it is desired not to draw attention to the warning lights. Because the lights are integrated into standard appearing accessories that are adapted to appeal to consumers and because the conventional warning lights attached to emergency vehicles are designed primarily for visibility, the system does not produce the wind drag and the wind noise as does the conventional warning lights attached to emergency vehicles.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A system of warning lights for a vehicle, said system comprising:

a first light unit dimensioned and configured to attach to a front of the vehicle at a height above a front bumper, said first light unit configured to resemble a wind deflector, said first light unit including a plurality of forward facing warning lights, said plurality of forward facing warning lights configured to direct illumination away from an occupant of the vehicle when said first light unit is attached to the vehicle;

a control circuit connected to said plurality of forward facing warning lights, said control circuit selectively activating said plurality of forward facing warning lights to produce at least two different types of visually distinct warning light signals;

a second light unit dimensioned and configured to attach to a rear of the vehicle at a height above a rear bumper, said second light unit including a plurality of rearward facing warning lights, said second light unit configured to resemble a rear spoiler, said plurality of rearward facing warning lights configured to direct illumination away from an occupant of the vehicle when said second light unit is attached to the vehicle, said control circuit connected to said plurality of rearward facing warning lights, said control circuit selectively activating said plurality of rearward facing warning lights to produce at least two different types of visually distinct warning light signals; and a pair of third light units each dimensioned and configured to attach adjacent to a front side window of the vehicle, each one of said pair of third light units configured to resemble a window vent visor, each one of said pair of third light units including at least one outwardly facing warning light, each one of said at least one outwardly facing warning light configured to direct illumination away from an occupant of the vehicle when said pair of third light units are attached to the vehicle, said control circuit connected to each one of said at least one outwardly facing warning light, said control circuit selectively activating each one of said at least one outwardly facing warning light to produce at least two different types of visually distinct warning light signals.

2. The system of claim 1 further including a pair of fourth light units each dimensioned and configured to attach adjacent to a rear side window of the vehicle, each one of said pair of fourth light units including at least one second outwardly facing warning light, said control circuit connected to each one of said at least one second outwardly facing warning light, said control circuit selectively activating each one of said at least one second outwardly facing warning light to produce at least two different types of visually distinct warning light signals, and each one of said at least one second outwardly facing warning light configured to direct illumination away from an occupant of the vehicle when said pair of fourth light units are attached to the vehicle.

3. The system of claim 1 wherein said first light unit further includes at least one takedown light configured to illuminate an area in front of the vehicle.

4. The system of claim 1 wherein said plurality of forward facing warning lights are integrated into said first light unit such that said plurality of forward facing warning lights are not substantially apparent to an observer when said plurality of forward facing warning lights are not illuminated.

5. The system of claim 1 wherein said plurality of rearward facing warning lights are integrated into said second light unit such that said plurality of rearward facing warning lights are not substantially apparent to an observer when said plurality of rearward facing warning lights are not illuminated.

6. The system of claim 1 wherein at least one of said pair of third light units includes an alley light, and said alley light configured to illuminate an area on a corresponding side of the vehicle.

7. An apparatus providing warning lights for a vehicle, said system comprising:
a first light unit dimensioned and configured to attach to a front of the vehicle at a height above a front bumper, said first light unit configured to be positioned on an outside surface of the vehicle, said first light unit including a plurality of forward facing warning lights, said plurality of forward facing warning lights integrated into said first light unit such that said first light unit has an outward appearance resembling a wind deflector when said plurality of forward facing warning lights are not illuminated, said first light unit including at least one takedown light configured to illuminate an area in front of the vehicle when said first light unit is attached to the vehicle; and
a control circuit connected to said plurality of forward facing warning lights, said control circuit selectively activating said plurality of forward facing warning lights to produce at least two different types of visually distinct warning light signals.

8. The apparatus of claim 7 wherein said plurality of forward facing warning lights are positioned adjacent a front surface of said first light unit, and each one of said plurality of forward facing warning lights projecting a light beam through an opening in said front surface of said first light unit.

9. The apparatus of claim 7 wherein said plurality of forward facing warning lights are positioned behind a front surface of said first light unit, and each one of said plurality of forward facing warning lights projecting a light beam through a translucent portion of said first light unit.

10. The apparatus of claim 7 further including a second light unit dimensioned and configured to attach to a rear of the vehicle at a height above a rear bumper, said second light unit including a plurality of rearward facing warning lights, said second light unit configured to resemble a rear spoiler, said plurality of rearward facing warning lights configured to direct illumination away from an occupant of the vehicle when attached to the vehicle, said control circuit connected to said plurality of rearward facing warning lights, and said control circuit selectively activating said plurality of rearward facing warning lights to produce at least two different types of visually distinct warning light signals.

11. The apparatus of claim 10 wherein said plurality of rearward facing warning lights are integrated into said second light unit such that said plurality of rearward facing warning lights are not substantially apparent to an observer when said plurality of rearward facing warning lights are not illuminated.

12. The apparatus of claim 7 further including a pair of third light units each dimensioned and configured to attach adjacent to a front side window of the vehicle, each one of said pair of third light units configured to resemble a window vent visor, each one of said pair of third light units including at least one outwardly facing warning light, each one of said at least one outwardly facing warning light configured to direct illumination away from an occupant of the vehicle when said pair of third light units are attached to the vehicle, said control circuit connected to each one of said at least one outwardly facing warning light, said control circuit selectively activating each one of said at least one outwardly facing warning light to produce at least two different types of visually distinct warning light signals.

13. The apparatus of claim 7 further including a pair of fourth light units each dimensioned and configured to attach adjacent to a rear side window of the vehicle, each one of said pair of fourth light units including at least one second outwardly facing warning light, said control circuit connected to each one of said at least one second outwardly facing warning light, said control circuit selectively activating each one of said at least one second outwardly facing warning light to produce at least two different types of visually distinct warning light signals, and each one of said at least one second outwardly facing warning light configured to direct illumination away from an occupant of the vehicle when said pair of fourth light units are attached to the vehicle.

14. The apparatus of claim 7 wherein at least one of said pair of third light units include a downward facing light, and said downward facing light configured to illuminate an area immediately adjacent the vehicle.

15. The apparatus of claim 7 wherein at least one of said pair of third light units include an alley light, and said alley light configured to illuminate an area on a corresponding side of the vehicle.

16. An apparatus providing warning lights for a vehicle, said system comprising:
a pair of first light units each dimensioned and configured to attach adjacent to a side window of the vehicle, each one of said pair of first light units including at least one outwardly facing warning light, each one of said at least one outwardly facing warning light configured to direct illumination away from an occupant of the vehicle when said pair of first light units are attached to the vehicle;

each one of said at least one outwardly facing warning light integrated into a corresponding one of said pair of first light units such that each one of said pair of first light units resemble a side window vent visor when said at least one outwardly facing warning light is not illuminated, at least one of said pair of first light units includes an alley light, said alley light configured to illuminate an area adjacent a corresponding side of the vehicle; and a control circuit connected to each one of said pair of first light units, said control circuit selectively activating each one of said pair of first light units to produce at least two different types of visually distinct warning light signals.

17. The apparatus of claim 16 wherein said at least one outwardly facing warning light is positioned adjacent a front surface of one of said first pair of light units, and said at least one outwardly facing warning light projects a light beam through an opening in said front surface of said one of said first pair of light units.

18. The apparatus of claim 16 wherein said at least one outwardly facing warning light is positioned adjacent a front surface of one of said first pair of light units, and said at least one outwardly facing warning light projects a light beam through a translucent portion in said front surface of said one of said first pair of light units.

19. The apparatus of claim 16 further including a second light unit dimensioned and configured to attach to a front of the vehicle at a height above a front bumper, said first light unit configured to be positioned on an outside surface of the vehicle, said first light unit including a plurality of forward facing warning lights, said plurality of forward facing warning lights integrated into said first light unit such that said first light unit has a configuration that resembles a wind deflector when said plurality of forward facing warning lights are not illuminated, and said control circuit selectively activating said plurality of rearward facing warning lights to produce at least two different types of visually distinct warning light signals.

20. The apparatus of claim 16 further including a second light unit dimensioned and configured to attach to a rear of the vehicle at a height above a rear bumper, said second light unit configured to resemble a rear spoiler, said second light unit including a plurality of rearward facing warning lights, said plurality of rearward facing warning lights configured to direct illumination away from an occupant of the vehicle when attached to the vehicle, said control circuit connected to said plurality of rearward facing warning lights, and said control circuit selectively activating said plurality of rearward facing warning lights to produce at least two different types of visually distinct warning light signals.

* * * * *